Jan. 27, 1959     W. STELZER     2,870,606
BOOSTER BRAKE MECHANISM
Filed Jan. 13, 1953
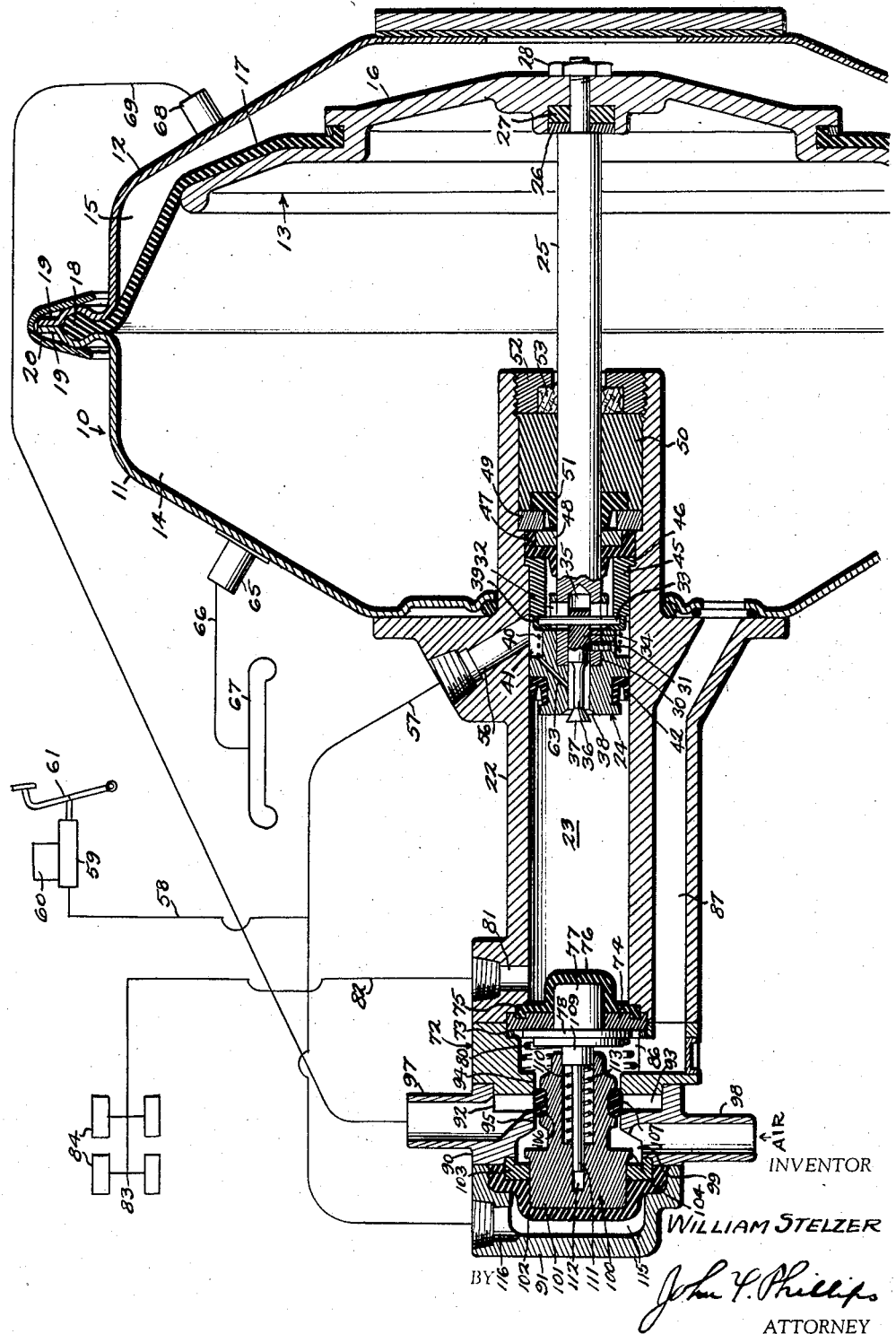
INVENTOR
WILLIAM STELZER
BY
ATTORNEY United States Patent Office 2,870,606
Patented Jan. 27, 1959

2,870,606

BOOSTER BRAKE MECHANISM

William Stelzer, Summit, N. J.

Application January 13, 1953, Serial No. 330,942

12 Claims. (Cl. 60—54.6)

This invention relates to booster brake mechanism and more particularly to the type of booster brake mechanism which is used in conjunction with a conventional cylinder to be actuated upon the displacement of hydraulic fluid from the master cylinder upon operation of the brake pedal.

In substantially all types of booster brake mechanisms, operation of the brake pedal controls a valve mechanism to energize a booster motor to assist the operator in generating the necessary hydraulic braking pressures in the system. Initial movement of the brake pedal from its normal off position operates against hydraulic fluid pressure prior to the actual engagement of the brake shoes with the brake drums, thus requiring brake pedal force greater than is necessary for movement of the brake shoes into engagement with the drums, and this causes a false "feel" in the brake pedal. It is desirable that this force be reduced, while at the same time it is desirable that the brake pedal, during brake application, be provided with "feel" which will be a reaction force proportional to the generated hydraulic pressure which actually applies the brakes.

An important object of the present invention is to provide a novel arrangement of parts in a booster brake mechanism of the character referred to, wherein displacement of fluid from the master cylinder upon initial operation of the brake pedal will effect energization of the booster motor with a minimum degree of resistance to movement of the brake pedal, thus eliminating the force required initially to move the brake pedal during that portion of the operation of the brake system in which the brake shoes perform no braking action but merely are being moved into engagement with the brake drums.

A further object is to provide such an apparatus in which a fluid pressure chamber is associated with the booster motor for the displacement of fluid from such chamber into the brake lines, and wherein the pressures in such chamber transmit no reactionary force to the brake pedal until the play between the brake shoes and drums has been taken up.

A further object is to provide such an apparatus wherein the fluid chamber is provided with a pressure responsive means for reacting against a manually controllable booster motor valve mechanism, but wherein the fluid responsive means transmits no force to the valve mechanism as a result of pressures in said chamber until after the brake shoes have engaged the drums.

A further object is to provide a fluid pressure responsive means and a valve mechanism of the type referred to wherein two spring devices engage the fluid responsive means, one spring device being interposed between the fluid responsive means and the valve mechanism and being relatively lightly tensioned and the other spring means being of greater tension so as to oppose movement of the fluid pressure responsive means until after actual braking pressures have been generated in the chamber referred to, there being play between the fluid responsive means and the valve mechanism so that the latter is subject to the application of manual force from the master cylinder to energize the motor without having its initial movement opposed by the fluid pressure responsive means.

A further object is to provide a highly simplified type of valve mechanism for controlling the booster motor.

Other objects and advantages of the invention will become apparent during the course of the following description.

In the drawing I have shown one embodiment of the invention. In this showing:

The figure is an axial sectional view through the booster brake mechanism, parts being broken away and parts of the system as a whole being diagrammatically indicated.

Referring to the drawing, the numeral 10 designates a booster motor as a whole shown in the present instance as a vacuum motor, in which the source of pressure differential is the intake manifold of the motor vehicle engine, as further referred to below. The motor comprises a pair of casing sections 11 and 12 between which is arranged a pressure movable unit indicated as a whole by the numeral 13 and dividing the motor into a pair of chambers, one of which is a constant pressure chamber indicated by the numeral 14 and the other of which is a variable pressure chamber 15 controlled by the valve mechanism to be described.

The pressure movable unit 13 comprises a plate 16 to which is anchored, in any suitable manner, a flexible diaphragm 17 the outer periphery of which is provided with a bead 18 clamped between peripheral flanges 19 formed on the casing sections and held in position by a clamping ring 20.

The casing section 11 supports a cast body 22 forming a hydraulic pressure cylinder 23. A piston indicated as a whole by the numeral 24 operates in the cylinder 23 and is carried by a piston rod 25, the right hand end of which preferably seats against a washer 26 beneath which is arranged a resilient disk 27. A nut 28 fixes the piston rod 25 to the plate 16, as shown.

The piston 24 is provided with an axial recess 30 into which the piston rod 25 projects and this rod is fixed to the piston by a set screw 31. The piston rod 25 and piston 24 are longitudinally slotted as at 32 to receive a transverse pin 33 extending through a stem 34 slidable in an axial recess 35 of the piston 24. The stem 34 is provided with a reduced portion 36 terminating in a valve 37 engageable with a seat 38 formed at the open end of the axial recess 35.

The pin 33 has its ends arranged in a ferrule 39 urged to the right by a spring 40 mounted in an annular groove 41 formed in the piston 24. This spring, therefore, tends to urge the valve 36 to closed position for a purpose to be described. A double lipped seal 42 is carried by the piston 24 and engages the wall of the cylinder 23.

Within the cylinder 23 is arranged a sleeve 45 shouldered as at 46 to be retained in the body 22. The sleeve 46 engages the pin 33 or ferrule 39, or both, to limit movement of these elements toward the right when the piston 24 moves to its normal off position, as shown in the drawing.

The sleeve 45 is backed-up by a seal 47 surrounding the piston rod 25 and within this seal is a ring 48 backed-up by a ring 49 which, in turn, engages a bearing 50. A seal 51 surrounds the piston rod 25 and is arranged between the ring 49 and bearing 50. The bearing 50 is retained in position by a gland 52 threaded in the inner end of the body 22 and preferably packed as at 53. The seals 47 and 51 and the packing 53 adequately seal the piston rod 25 against the leakage of hydraulic fluid therealong.

The body 22 is provided with a passage 56 to which is connected a conduit indicated diagrammatically by the numeral 57. This conduit is supplied with hydraulic fluid through a line 58 leading to a conventional master cylinder 59 having the usual reservoir 60 and being operated by a conventional brake pedal 61. The passage 56 communicates with the annular groove 41 and this groove, in turn, communicates through a small passage 63 with the space surrounding the reduced stem portion 36 to supply replenishing fluid to the cylinder 23, if necessary, when the parts are in the normal off positions shown.

The casing section 11 is provided with a suitable fitting 65 for connection with a line 66 leading to the intake manifold 67 so that the motor chamber 14 is always subject to intake manifold vacuum when the vehicle engine is running. The casing section 12 is provided with a similar fitting 68 to which is connected one end of a line 69 the other end of which is connected to and controlled by a novel valve mechanism described below.

To the left hand end of the body 22 is fixed in any suitable manner, a valve body indicated as a whole by the numeral 72. This valve body cooperates with the body 22 to form an internal annular groove 73 in which is arranged a ring 74 and between this ring and the adjacent end portion of the body 22 is clamped a peripheral bead 75 of a flexible diaphragm 76 cupped, as shown, to receive a boss 77 carried by a plate 78 engageable against the ring 74 to limit its movement toward the right. As will become apparent, the boss 77 and plate 78 are movable to the left under the influence of braking pressures in the chamber 23 when such pressures become sufficient to move the diaphragm 76 to the left. A spring 80 engages the plate 78 to tend to maintain it in its normal position shown.

The generation of pressures in the chamber 23 will displace fluid through a port 81 through lines 82 and 83 to the vehicle brake cylinders 84. It will become apparent that the cylinder 23 is closed at one end by the diaphragm 76 and that fluid will be displaced from the cylinder 23 upon movement of the piston 24 to the left.

The spring 80 is arranged in an annular chamber 86 formed in the valve body 72 and this chamber is in fixed communication through passage means 87 with the constant pressure chamber 14 of the motor. A valve mechanism, to be described, controls communication between the chamber 86 and the motor chamber 15.

To the left of the valve body 72 is arranged an annular member 90 retained in position against the valve body by a cap structure 91. The annular member 90 is annularly cut away as at 92 to form an annular port 93. To the left of the chamber 86 the left-hand extremity of the valve body is provided with an internally reduced cylinder 94 and the annular member 90 is provided with a similar internal cylinder 95 of the same diameter as and forming in effect a part of the cylinder 94. The radially inner edges of the port 93 are preferably slightly rounded, as shown, for a purpose to be described.

The annular member 90 is provided with a pair of nipples 97 and 98, the former of which is in fixed communication with the annular port 93. The nipple 97 is also connected to the other end of the line 69 and accordingly the pressure in the motor chamber 15 will always correspond to pressure in the annular port 93.

At its left hand end the annular member 90 is of an enlarged internal diameter to form a chamber 99 in fixed communication with the nipple 98. This nipple is in constant communication with the atmosphere, preferably through a suitable air cleaner (not shown).

A valve indicated as a whole by the numeral 100 is arranged within the unit comprising elements 72, 90 and 91. The valve 100 comprises a relatively large head 101 projecting into a cupped resilient diaphragm 102 the periphery of which is arranged between the member 90 and cap 91, and a retaining ring 103 is arranged within the peripheral portion of the diaphragm 102 and acts as a bearing for a head 101, this head having an annular flange 104 engageable with the ring 103 to positively limit movement of the head 101 to the left.

The valve body 100 is provided with an annular groove 106 in which is arranged an annular resilient valve element 107 of a cross-sectional shape shown in the drawing. The valve element 107 is shown in a lapped position, completely closing the annular port 93. When the valve structure moves to the left the port 93 will communicate with the chamber 86, and the booster motor will be vacuum suspended. When the valve moves to the right, the annular port 93 will communicate with the chamber 99 and with the atmosphere and will be cut off from the constant vacuum in the chamber 86, and the booster motor will be energized.

To the left of the plate 78 is a small plunger 109 operable in an axial recess 110 formed in the valve body 100, and a stem 111 carried by the plunger 109 is slidable in a recess 112 formed in the valve body. A light spring 113 is arranged in a cylindrical recess 110 and urges the plunger 109 to the right. This spring is substantially weaker than the spring 80, for a purpose to be described.

The cap 91 forms a chamber 115 to the left of the diaphragm 102 and this chamber communicates through a port 116 with the conduit 57, previously described.

*Operation*

Except for the fact that the valve 100 is shown in lap position, all of the parts in the drawing are shown in their normal off positions. When the brake pedal is fully released, the valve element 107 occupies a position to the left of the position shown in the drawing in which case the annular port 93 communicates with the chamber 86 which is always in communication with the constant vacuum chamber 14 through the passage means 87. The nipple 97 will be in communication with the annular port 93 and hence, through line 69, the motor chamber 15 will be exhausted and the pressure movable unit 13 will be vacuum suspended.

Upon operation thereof, the brake pedal 61 initially does not meet the usual resistance of the conventional residual pressure valve in the master cylinder 59, but initially meets no resistance except for the negligible tension of the spring 113, as will become apparent. Operation of the brake pedal displaces fluid from the master cylinder through line 58 into the line 57. Since the cylinder 23 and chamber 41 are full of hydraulic fluid, no fluid will flow through passage 56 although static pressure will be built-up in the chamber 41. However, the chamber 115 within the cap 91 is expansible and fluid flowing from the left end of the line 57 into the chamber 115 will move the diaphragm 102 to the right and the valve element 107 will be moved to the lap position shown in the drawing. As stated, this movement of the valve body 100 takes place solely against the tension of the spring 113 and, of course, against the negligible friction between the valve element 107 and the cylindrical surfaces 94 and 95. It particularly will be noted that the play between the valve body 100 and the plate or plunger 78 will not be taken up at the lap valve position, as shown in the drawing.

The valve element 107 is resilient and adequately seals against leakage therearound. The valve element is provided with a smooth outer surface which slides readily across the annular port 93 and when the lap position is reached, the annular port will be cut off from both of the chambers 86 and 99, with the former of which the annular port previously communicated. Accordingly the nipple 97 will be disconnected from the chamber 86, while sub-atmospheric pressure remains in the motor chamber 15.

Upon further movement of the brake pedal additional fluid displaced into chamber 115 will move the valve body 100 and valve element 107 further to the right to connect the annular port 93 with the chamber 99 thus admitting air into the chamber 15 and differential pressure will start to build up in the motor. The valve body 100 initially contacts the plate or flange 78 at the point where the valve 107 initially connects the chamber 99 to the port 93 and, accordingly, it will be apparent that an appreciable opening movement of the valve element 107 takes place under the conditions of low resistance to movement of the valve body 100, described above.

Promptly upon the starting of the movement of the pressure responsive unit 13, the piston 24 moves to the left and the pin 33 and its retainer 39 will move relative to the piston 24 to close the valve 37. The piston 24 now starts to build up pressure in the chamber 23 and initial pressure in the chamber 23 will be quite low and not sufficient to displace the diaphragm 76 toward the left since the only resistance to movement of fluid from the cylinder 23 through the lines 82 and 83 into the brake cylinders 84 will be negligible, since little force is required to move the brake shoes into engagement with the drums. Thus the diaphragm 76 at this time will not be moved toward the left, but as soon as the brake shoes engage the drums, a pressure build-up commences in the cylinder 23. When it reaches a predetermined point, this pressure displaces the diaphragm 76 toward the left against the tension of spring 80, and the plates 78 will come into engagement with adjacent end of the valve body 100, thus transmitting through the valve body and through the fluid in the chamber 115 and lines 57 and 58, a resistance to movement of the brake pedal 61. The diaphragm 76 will be moved toward the left, or will tend to move toward the left, under the influence of whatever pressure is present in the chamber 23, and accordingly, the operator will feel a resistance to the brake pedal which is proportionate to the pressure in the cylinder 23. The proportionate resistance thus encountered by the brake pedal will be the same as the ratio of the effective areas of the diaphragms 76 and 102. Particular attention is invited to the fact that the spring 80 yields at a predetermined pressure, but after it has yielded to the point where the plate 78 engages the adjacent end of the valve spool, the spring continues to play a part in the operation of the booster. Through a brake applying operation, the force which must be opposed by a primary pressure in the chamber 115 is equal to the force of the hydraulic pressure in the chamber 23 minus the force of the spring 80. For this reason, there is no sudden change in booster ratio or in the "feel" in the brake pedal.

The valve mechanism referred to provides a follow-up action of the pressure responsive unit 13 relative to the pedal 61. The building up of pressure in the cylinder 23 when movement of the brake pedal is stopped, displaces the diaphragm 76 to the left to lap the valve element 107 and thus stop further energization of the motor. Further depression of the brake pedal creates higher pressure in the chamber 115 and moves the valve element to the right to further energize the motor until the necessary pressure is generated in the cylinder 23 to again lap the valve element.

The springs 80 and 113 are important in the functioning of the booster mechanism. Without the spring 113, of course, the pistons 77 and 101 would, in effect, operate as a single unit, as in the conventional construction and the booster ratio would start with zero and increase until maximum power is reached. With the present construction, the reaction in the first stage of movement of the brake pedal is constant, being merely a reflection of the tension of the spring 113. After sufficient pressure is generated in the high pressure chamber 23 to compress the spring 80 and engage the plate 78 with the valve piston 101, the booster ratio decreases gradually, since at higher pressures the force of the spring 80 becomes negligible compared with the hydraulic pressure in the chamber 23, the booster ratio, i. e., the booster ratio of wheel cylinder hydraulic pressure and master cylinder hydraulic pressure, approaching the ratio of the area of the valve piston 101 to the area of the plunger 77. Therefore, while previously there was provided a gradually increasing booster ratio, the present construction provides a gradually decreasing booster ratio.

When the brake pedal is released, pressure in the chamber 115 obviously drops and pressure in the cylinder 23 moves the diaphragm 76 to the left with the valve to force the latter to the normal "off" position, this operation obviously taking place very rapidly.

When the pressure in the chamber 23 drops to the point where it is overcome by the tension of the spring 80, the diaphragm 76 and associated elements return to normal position and the valve body 100 is maintained in normal "off" position by the spring 113. It particularly will be noted that aside from its own resiliency, the diaphragm 76 is opposed in its initial movement toward the left solely by the spring 80 and this spring is preferably so tensioned that the plate 78 will come into engagement with the valve body 100 approximately when the brake shoes initially engage the brake drum. It is beyond this point that it is desirable to transmit positively from the diaphragm 76 to the valve body 100 the pressures present in the cylinder 23 so that the operator will feel in the brake pedal a resistance proportional to the force of brake application. Prior to this point, it is desirable that the operator be enabled to initially energize the motor without having to displace fluid from the chamber 23 and this result is accomplished in a highly efficient manner with the present construction. With the arrangement of parts shown in the drawing, there is normally lost motion between the plate 78 and valve body 100 and the latter is maintained in normal position solely by the tension of the light spring 113. This spring cuts out of operation and ceases to affect the functioning of the parts as soon as the plate 78 engages the end of the valve body 100.

When the parts return to their normal "off" positions, the sleeve 45 opens the valve 37 and if any leakage of hydraulic fluid from the system has occurred, this leakage can be replenished by fluid passing through the passage 63.

From the foregoing it will be apparent that the present construction relieves the brake pedal of false reactions when the brake pedal is initially moved from its normal "off" position, thus providing a brake pedal operation which is quite soft up to the point when the brake shoes engage the brake drums. Thereafter the operator will always feel in the brake pedal a resistance which is proportional to brake application. The operator performs part of the work in applying the brakes since fluid displaced from the master cylinder into the chamber 41 exerts a force to the left to assist the booster motor in applying the brakes.

I claim:

1. A booster brake mechanism comprising a hydraulic fluid chamber having an outlet for connection with the brakes of a motor vehicle, a fluid displacing member movable into said chamber, a normally deenergized motor connected to said fluid displacing member, a pressure movable member biased to a normal position and exposed to said chamber to be moved upon the building up of pressure therein, and a control device connected to said motor adjacent said pressure movable member and having a normal position in which said motor is deenergized and being movable relatively toward said pressure movable member to energize said motor, there being play between said control device and said pressure movable member when the former is in normal position, said control device being movable from said normal position to energize said motor to move said piston into said chamber and build up pressure therein, whereupon said pressure movable member comes into engagement with said control device to transmit thereto pressure reaction forces in said chamber.

2. A booster brake mechanism comprising a chamber having an outlet for connection with the brakes of a vehicle, a plunger movable into said chamber to displace fluid therefrom, a differential fluid pressure operated motor connected to said plunger, a pressure responsive member biased to a normal position and exposed to said chamber to be moved upon increases in pressure therein, and a valve mechanism connected to said motor for controlling it, said valve mechanism comprising an element arranged adjacent said pressure responsive member and movable toward said member from a normal motor deenergizing position to energize said motor, there being play between said element of said valve mechanism and said pressure responsive member whereby the latter, upon a motor energizing movement of said valve mechanism to generate pressure in said chamber, will contact said element of said valve mechanism to transmit thereto fluid pressure reaction forces from said chamber.

3. Apparatus constructed in accordance with claim 2 having a hydraulic control chamber to the pressures in which said element of said valve mechanism is exposed to be moved to energize said motor upon an increase in pressure in said control chamber, and manual means connected to said control chamber for controlling pressures therein.

4. A booster brake mechanism comprising a hydraulic cylinder having an outlet for connection with the brakes of a motor vehicle, a plunger movable into one end of said cylinder to displace fluid therefrom, a motor connected to said plunger, a fluid pressure movable member exposed to pressures in said cylinder adjacent the other end thereof, a manually operable control mechanism connected to said motor, said control mechanism having a normal off position from which it is relatively freely movable independently of said pressure movable member to energize said motor, and means connected for utilizing movement of said pressure movable member incident to increases in pressure in said cylinder for opposing motor energizing movement of said control mechanism.

5. Apparatus constructed in accordance with claim 4 wherein said pressure movable member is movable axially in a direction away from said cylinder upon increases in pressure therein, said control mechanism being movable axially of said cylinder and arranged beyond said other end thereof, the means for opposing motor energizing movement of said control mechanism comprising axially movable elements carried respectively by said control mechanism and by said pressure movable member, said elements having a space therebetween when said control mechanism is in a motor deenergizing position and said elements contacting with each other when said control mechanism is moved to energize said motor and said pressure responsive member moves under the influence of increases in pressures in said cylinder.

6. A booster brake mechanism comprising a hydraulic fluid chamber having an outlet for connection with the brake of a motor vehicle, a fluid displacing member movable into said chamber, a normally deenergized motor connected to said fluid displacing member, a member exposed to said chamber and displaceable from a normal position by fluid pressure in said chamber, resilient means engaging and urging said displaceable member to said normal position, a control device connected to said motor having a normal position in which said motor is deenergized and being movable relatively toward said pressure displaceable member to energize said motor, and resilient means weaker than said first named resilient means connected to said control device and tending to urge said control device to its normal position, there being play between said control device and said displaceable member when they are in their normal positions, said displaceable member being movable against the tension of said first named resilient means upon the building up of a predetermined pressure in said chamber to take up said play and oppose motor energizing movement of said control device.

7. Apparatus constructed in accordance with claim 6 wherein said first-named resilient means comprises a compression coil spring one end of which is stationary and the other end of which engages said displaceable member, said weaker resilient means comprising a compression spring interposed between and engaging said control device and said displaceable member.

8. A booster brake mechanism comprising a chamber having an outlet for connection with the brakes of a vehicle, a plunger movable into said chamber from one end thereof to displace fluid therefrom, a differential fluid pressure operated motor connected to said plunger, a pressure movable member forming a closure for the other end of said cylinder and movable axially thereof away from said chamber upon increases of pressure therein, a valve mechanism connected to and controlling said motor, said valve mechanism occupying a normal motor deenergizing position from which it is movable toward said displaceable member to energize said motor, there being play between said valve mechanism and said displaceable member when they are in their normal positions, a spring having one end stationary and its other end engaging and urging said displaceable member to its normal position and tensioned to prevent movement thereof until a predetermined pressure is built-up in said chamber, and a relatively weaker resilient means engaging said valve mechanism and biasing it to its normal position, said valve mechanism being movable from its normal position solely against the tension of said weaker resilient means and being engageable by said pressure responsive member, when said play is taken up, whereby said valve mechanism is opposed in its motor energizing movement by pressures in said chamber.

9. A booster brake mechanism comprising a hydraulic fluid chamber having an outlet for connection with the brakes of a motor vehicle, a fluid displacing member movable into said chamber from one end thereof, a normally deenergized motor connected to said fluid displacing member, a member exposed to said chamber at the other end thereof and displaceable from a normal position by fluid pressure in said chamber, a spring having one end stationary and its other end engaging said displaceable member and urging it to said normal position, a control device connected to said motor and having a normal position in which said motor is deenergized and being movable relatively toward said pressure displaceable member to energize said motor, resilient means weaker than said spring engaging said control device and tending to urge said control device to its normal position, there being play between said control device and said displaceable member when they are in their normal positions, said displaceable member being movable against the tension of said spring upon the building up of a predetermined pressure in said chamber to take up said play and oppose motor energizing movement of said control device, a control chamber, a pressure responsive member in such chamber engaging said control device to move the latter away from its normal position upon increases in pressure in said control chamber, and manually operable means connected for supplying fluid to said control chamber to control the pressures therein.

10. In a hydraulic braking system for automotive vehicles having wheel cylinders to operate the brakes, a master cylinder operated by the operator, a booster connected to receive fluid from said master cylinder and to transmit fluid under pressure to said wheel cylinders, said booster comprising a power operated motor mechanism connected to operate said booster, in combination, a control device for said booster comprising a movable member exposed to the fluid pressure transmitted by said master cylinder, a valve mechanism operatively connected with said movable member and to said motor mechanism to control the latter, a second movable member exposed to the fluid pressure transmitted by said booster to said wheel cylinders and arranged to oppose said first-mentioned movable member, said movable members being movable a short distance relative to each other, and resilient means connected to and yieldingly opposing said second movable member to prevent its opposition against said first mentioned movable member until the fluid transmitted to said wheel cylinders has reached a predetermined pressure.

11. The construction according to claim 10, where said resilient means comprises a spring acting on said second movable member in opposition to the fluid acting on said second movable member to yieldingly urge the latter to disengage from said first movable member, and a stationary support to support said spring.

12. The construction according to claim 10, and spring means engaging said valve mechanism and said first-mentioned movable member and urging them to retract into a position where said motor mechanism is deenergized, said spring means engaging and reacting against said second movable member to urge the latter also into a retracted position.

References Cited in the file of this patent

UNITED STATES PATENTS

| | | |
|---|---|---|
| 2,260,490 | Stelzer | Oct. 28, 1941 |
| 2,383,682 | Price | Aug. 28, 1945 |
| 2,393,524 | Fant | Jan. 22, 1946 |
| 2,433,953 | Ingres | Jan. 6, 1948 |
| 2,618,123 | Stelzer | Nov. 18, 1952 |
| 2,763,989 | Ayers | Sept. 25, 1956 |